United States Patent [19]

Kauffman

[11] 4,252,219
[45] Feb. 24, 1981

[54] TRANSMISSION LOCK MECHANISM
[75] Inventor: Allen L. Kauffman, Dexter, Mich.
[73] Assignee: General Motors Corporation, Detroit, Mich.
[21] Appl. No.: 953,256
[22] Filed: Oct. 20, 1978
[51] Int. Cl.³ .............................................. B62C 7/02
[52] U.S. Cl. ..................................................... 188/69
[58] Field of Search .................... 192/4 A; 188/31, 69
[56] References Cited
U.S. PATENT DOCUMENTS

| 2,860,731 | 11/1958 | Hause | 188/69 |
|---|---|---|---|
| 2,954,103 | 9/1960 | Sand | 188/69 |
| 2,964,135 | 12/1960 | Sand | 188/69 |
| 3,074,513 | 1/1963 | Robinson | 188/69 |

Primary Examiner—George H. Krizmanich
Attorney, Agent, or Firm—Donald F. Scherer

[57] ABSTRACT

A manually operable locking mechanism for an automatic transmission has a pawl which engages a toothed member connected to the transmission output shaft. The pawl is controlled for engagement and disengagement with the toothed member through a manually operated cam which moves a lock lever toward the engaged position. The lock lever, through a tension spring, urges a lock strut to enforce engagement of the pawl. On manual disengagement, the cam contacts and moves the lock strut to relieve the locking force from the pawl thus permitting disengagement of the pawl and the toothed member. The lock lever abuts the cam after disengagement to establish the relative positions of the cam, lock lever and lock strut when the disengage position is selected.

3 Claims, 4 Drawing Figures

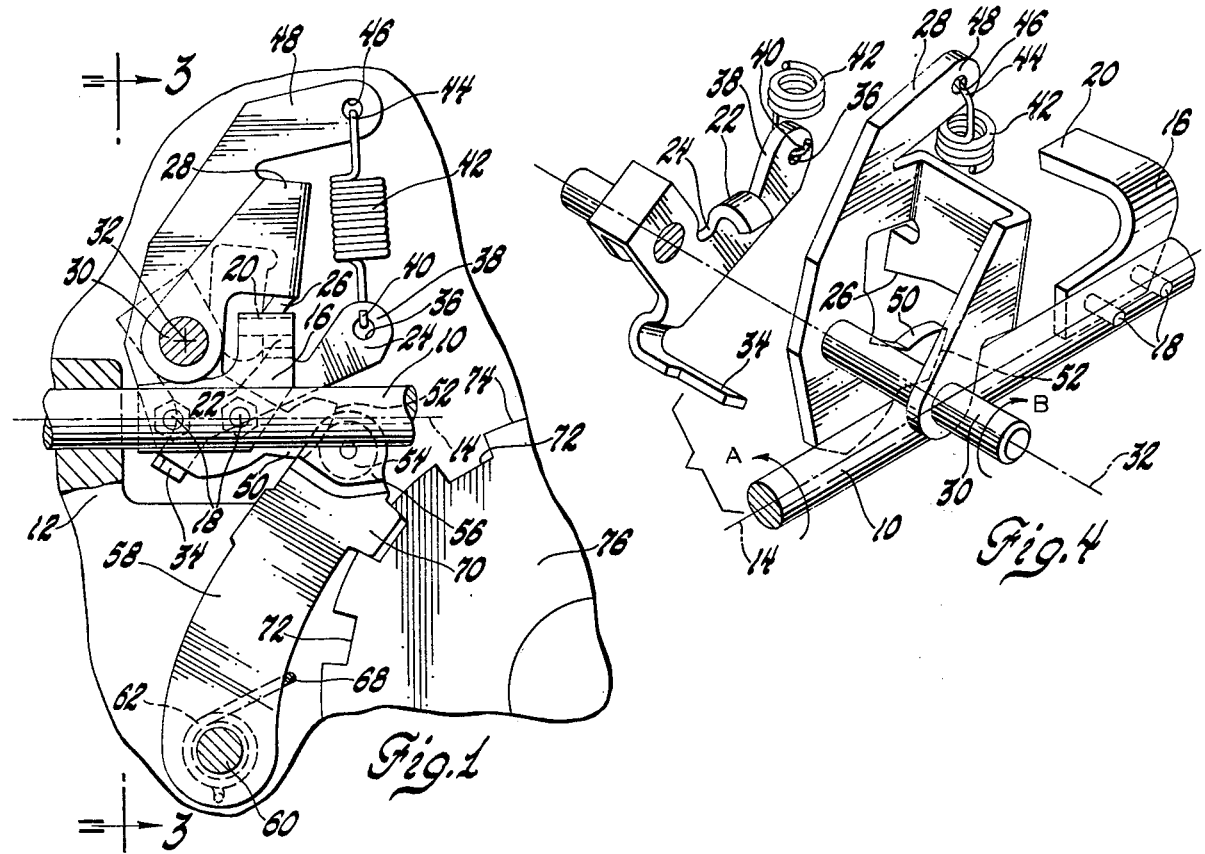
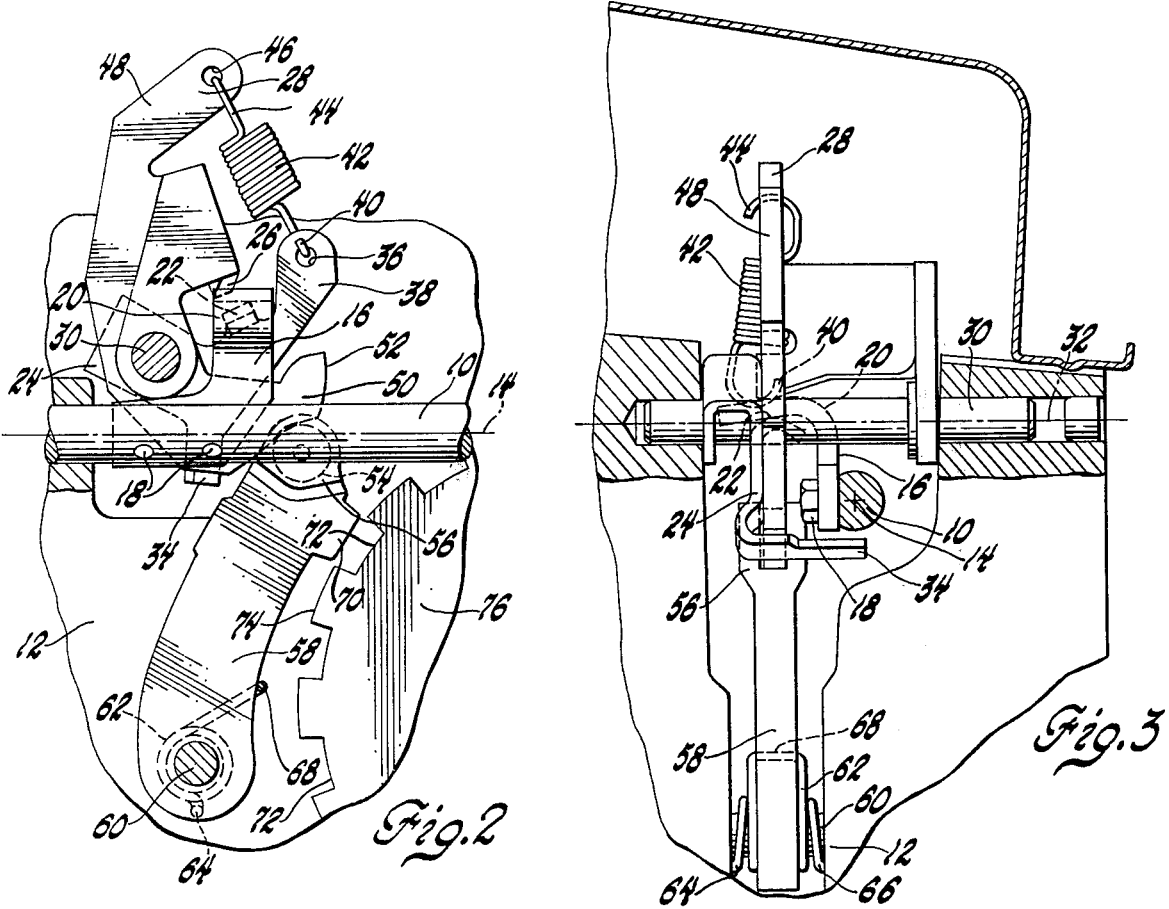

TRANSMISSION LOCK MECHANISM

This invention relates to lock mechanisms and more particularly to lock mechanisms for selectively controlling the output member of a transmission.

It is an object of this invention to provide an improved transmission lock mechanism.

It is a further object of this invention to provide an improved transmission lock mechanism having an input cam which actuates a linkage to engage a locking pawl and abuts a member of the linkage on disengagement to remove the linkage force from the locking pawl.

It is another object of this invention to provide an improved transmission lock mechanism having an input member which actuates a linkage to engage a locking pawl with a transmission member and also abuts a linkage member on disengagement to remove the linkage force from the locking pawl and wherein the linkage has an appendage thereon which abuts the input member to position the linkage at the desired disengaged position.

Other objects and advantages of the present invention will be more apparent from the following description and drawings wherein:

FIG. 1 is a view of the linkage in the engaged position;

FIG. 2 is a view of the linkage in the disengaged position;

FIG. 3 is a view taken along line 3—3 of FIG. 1; and

FIG. 4 is an exploded perspective view of the linkage.

Referring to the drawings, wherein like characters represent the same or corresponding parts throughout the several views, there is shown a manually operated shaft 10 which is supported in a transmission housing 12 for rotation about an axis 14. A cam 16 is secured to the manual shaft 10 by a pair of fasteners 18 such that the cam 16 will rotate with the manual shaft 10. The cam 16 has a finger portion 20 which is disposed between a cam surface 22, formed on a lock lever 24, and a surface 26, formed on a lock strut 28. The lock lever 24 and lock struct 28 are supported on a shaft 30 for rotation about an axis 32.

The lock lever 24 has an appendage 34 which extends below the manual shaft 10 and cam 16, as best seen in FIG. 3. An aperture 36 is formed in an arm 38 of the lock lever 24, in which aperture 36 is disposed one end 40 of a tension spring 42. The other end 44 of the tension spring 42 is disposed in an aperture 46 formed in an arm 48 of the lock strut 28. The tension spring 42 maintains the surfaces 22 and 26 in abutment with the finger 20 at the extreme positions shown in FIGS. 1 and 2.

The lock strut 28 also has an arm 50 on which is formed a cam surface 52 which is in abutting relationship with a bearing 54 disposed in a bifurcated end 56 of a locking pawl 58. The locking pawl 58 is rotatably mounted on a shaft 60 which is supported in the transmission housing 12. A torsion spring 62 surrounds the shaft 60 and has the ends 64 and 66 thereof secured to the transmission housing and the central portion 68 thereof abutting the locking pawl 58 in such a manner as to urge the locking pawl in a counterclockwise direction as viewed in FIGS. 1 and 2. The locking pawl 58 has formed thereon a tooth 70 which is designed to mesh with tooth spaces 72 formed in the outer periphery 74 of a gear member 76. The gear member 76 is rotatably supported in the transmission housing in such a manner as to be operatively connected to the output shaft of the transmission such that when the gear 76 is held stationary, by the locking pawl 58, the transmission output shaft will be held stationary.

To operate the lock mechanism from the disengaged position shown in FIG. 2 to the engaged position shown in FIG. 1, the manual shaft 10 is rotated counterclockwise, as viewed in FIG. 3, or in the direction of Arrow A as viewed in FIG. 4. Rotation of the manual shaft 10 results in rotation of the cam 16 such that the finger 20 through its contact with cam surface 22 causes rotation of the lock lever 24 in the direction of Arrow B when viewed in FIG. 4, or clockwise when viewed in FIGS. 1 and 2. The movement of lock lever 24 is transferred through the tension spring 42 to the lock struct 28 such that the arm 50 will rotate about the axis 32 to cause movement of the cam surface 52 on the bearing 54 which urges the locking pawl 58 to rotate clockwise about shaft 60 as that the tooth 70 will be moved toward engagement with one of the tooth spaces 72. If the tooth 70 and the tooth space 72 are in alignment, as shown in FIG. 1, the gear 76 will be restrained from rotation. If, however, the tooth 70 should abut the other periphery 74 of gear 76, the tension spring 42 will permit relative movement between the lock lever 24 and the lock strut 28 such that the force attempting to engage the pawl will be retained on the lock strut 28 until there is alignment between the tooth 70 and one of the tooth spaces 72 at which time the pawl 58 will engage the gear 76.

To disengage the lock mechanism, the manual shaft 10 is rotated in a direction opposite to Arrow A whereby the finger 20, which contacts the surface 26, will cause rotation of the lock strut 28 in a counterclockwise direction about axis 32 thereby moving the cam surface 52 relative to the bearing 54 such that the locking pawl 58 will be disengaged from the gear 76 through the action of spring 62. The tension spring 42 will transmit the motion of lock strut 28 to lock lever 24, during disengagement, until the appendage 34 abuts the manual shaft 10 or lower surface of cam 16. At this time, the lock mechanism is disengaged and the linkage is maintained in the disengaged position through the cooperation of finger 20, surfaces 22 and 26, appendage 34 and tension spring 42.

It should be appreciated that the spring rate of spring 42 and the preload force thereon is greater than the preload force and spring rate of spring 62 such that the locking pawl will respond to the forces which are developed in spring 42 during engagement of the locking pawl. It should also be understood that the removal of the locking force in the mechanism is controlled by movement of the manual shaft 10 and is not dependent on a stored spring force for returning the linkage consisting of the lock lever 24 and lock strut 28 to the disengage position. The locking pawl is disengaged through the force of spring 62, however, there are no linkage forces on the locking pawl at the time of disengagement since they have been removed through operation of the manual shaft 10.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A locking mechanism for a transmission output shaft having means drivingly connected thereto, said locking mechanism comprising: pawl means rotatably mounted on the transmission housing for selectively engaging the gear means to prevent rotation of the gear means and output shaft; manual means for initiating selective engagement upon movement by an operator in one rotational direction about a first axis; cam means for transmitting motion from said manual means, said cam means being rotatable about said first axis; lock lever means for receiving motion from said cam means and for transferring the motion to rotation about a second axis normal to the first axis; spring means connected to said lock lever means and receiving a force therefrom when said manual means is rotated in the one direction; and lock strut means connected to said spring means to be moved about said second axis, by the force in said spring means transmitted from said lock lever means, to engge said pawl means and move said pawl means into engagement with said gear means unless said pawl means abuts the outer surface of a tooth on the gear means at which time the force in said spring means through the lock strut maintains said pawl means in the abutting relation and urges said pawl means toward engagement with said gear means and enforces completion of the engagement when said pawl means and a tooth space on the gear means are aligned, said cam means engaging and moving said lock strut for selectively removing the force from said pawl means to permit disengagement of said pawl means from said gear means upon movement of said manual means by the operator in the other direction about said first axis.

2. A locking mechanism for a transmission output shaft having gear means drivingly connected thereto, said locking mechanism comprising; pawl means rotatably mounted on the transmission housing for selectively engaging the gear means to prevent rotation of the gear means and output shaft; manual means for initiating selective engagement upon movement by an operator in one rotational direction about a first axis; cam means for transmitting motion from said manual means, said cam means being rotatable about said first axis; lock lever means for receiving motion from said cam means and for transferring the motion to rotation about a second axis normal to the first axis; spring means connected to said lock lever means and receiving a force therefrom when said manual means is rotated in the one direction; lock strut means connected to said spring means to be moved about said second axis, by the force in said spring means transmitted from said lock lever means, to engage said pawl means and move said pawl means into engagement with said gear means unless said pawl means abuts the outer surface of a tooth on the gear means at which time the force is said spring means through the lock strut maintains said pawl means in the abutting relation and urges said pawl means toward engagement with said gear means and enforces completion of the engagement when said pawl means and a tooth space on the gear means are aligned, said cam means engaging and moving said lock strut for selectively removing the force from said pawl means to permit disengagement of said pawl means from said gear means upon movement of said manual means by the operator in the other direction about said first axis, and said lock lever having appendage means thereon for abutting said manual means when the locking mechanism is fully disengaged and cooperating with said spring means to maintain the position of said lock strut and lock lever relative to the manual means.

3. A locking mechanism for a tramsmission output shaft having means drivingly connected thereto, said locking mechanism comprising; pawl means rotatably mounted on the transmission housing for selectively engaging the gear means to prevent rotation of the gear means and output shaft; manual means for initiating selective engagement upon movement by an operator in one rotational direction about a first axis; cam means for transmitting motion from said manual means, said cam means being rotatable about said first axis; lock lever means for receiving motion from said cam means and for transferring the motion to rotation about a second axis normal to the first axis; spring means connected to said lock lever means and receiving a force therefrom when said manual means is rotated in the one direction; and lock strut means connected to said spring means to be moved about said second axis, by the force in said spring means transmitted from said lock lever means, to engage said pawl means and move said pawl means into engagement with said gear means unless said pawl means abuts the outer surface of a tooth on the gear means at which time the force in said spring means through the lock strut maintains said pawl means in the abutting relation and urges said pawl means toward engagement with said gear means and enforces completion of the engagement when said pawl means and a tooth space on the gear means are aligned, said cam means engaging and moving said lock strut for selectively removing the force from said pawl means to permit disengagement of said pawl means from said gear means upon movement said manual means by the operator in the other direction about said first axis, said spring means being effective to maintain abutment of said lock strut means and said lock lever means with said cam means when the locking mechanism is fully engged or fully disengaged.

* * * * *